June 8, 1948.   S. A. KRAFT   2,443,074
HYDRAULIC TRANSMISSION
Filed Sept. 29, 1944   6 Sheets-Sheet 2

Inventor
Selmer A. Kraft

Attorneys

June 8, 1948.　　　　S. A. KRAFT　　　　2,443,074
HYDRAULIC TRANSMISSION

Filed Sept. 29, 1944　　　　　　　　　　　　6 Sheets-Sheet 3

Inventor
Selmer A. Kraft
By Dodge and Son
Attorneys

June 8, 1948. S. A. KRAFT 2,443,074
HYDRAULIC TRANSMISSION
Filed Sept. 29, 1944 6 Sheets-Sheet 6

NEUTRAL

AHEAD LOW SPEED

AHEAD HIGH SPEED

REVERSE

Inventor
Selmer A. Kraft
By
Attorneys

Patented June 8, 1948

2,443,074

UNITED STATES PATENT OFFICE 2,443,074

HYDRAULIC TRANSMISSION

Selmer A. Kraft, Milwaukee, Wis., assignor to Nordberg Manufacturing Company, Milwaukee, Wis., a corporation of Wisconsin Application September 29, 1944, Serial No. 556,394

6 Claims. (Cl. 60—53)

This invention relates to hydraulic transmissions of a type particularly intended for use with marine type internal combustion engines which are not reversible, but the transmission is capable of use for other purposes.

The invention offers a simple and efficient drive, having a neutral position in which the driven shaft is hydraulically locked against rotation, reduced ratio forward and reverse drives and a direct forward drive. In all three drive positions the hydraulic circuit is pneumatically cushioned.

Generally stated the driving shaft rotates the vane elements of a vane pump while the vane elements of a similar motor turn with the alined but mechanically independent driven shaft. The two sets of vane elements are received in axially alined pump and motor chambers in a single cylindrical housing coaxial with the drive shaft and driven shaft.

Coaxial with the two shafts and the housing is a piston type control valve. This, like all other parts partaking of rotary motion, is in running balance. This control valve is shiftable axially between four functional positions arranged in the order: reverse, neutral, low and direct.

In neutral position the control valve unloads the pump (i. e. connects pump inlet and discharge) and hydraulically locks the motor unit. In both reverse and low positions the pump is connected in circuit with the motor, but the ports of the motor are interchanged as between the two positions so as to produce opposite directions of rotation of the motor. In neutral, reverse and low positions the cylindrical housing is locked by a band brake mechanism. This is of a dual type designed to be smooth acting and effective to resist rotary reactions regardless of direction.

The reduction ratios for low and reverse are produced by giving the motor vanes a larger displacement per revolution, than the displacement per revolution of the pump vanes. Hence the reduction ratios are the same for low and for reverse. A two-to-one reduction will be assumed merely for discussion.

In direct drive the brake is released so that the housing is free to rotate, and the pump and motor are each hydraulically locked so that the housing must turn as a unit with both sets of vanes.

The pump and motor have each a plurality of working spaces (two being illustrated). Hence the torque is balanced. The discharge passages from the pump working spaces are connected by a chamber which confines a gas cushion. In this way discharge pressures from the pump working spaces are equalized, and hydraulic shocks are absorbed. Relief valves are provided to relieve hydraulic overloads on the pump and motor.

To keep the pump working spaces full of liquid, in the event of creep in direct drive position, automatic supply valves are provided.

The control valve could be manually shifted, but it is advantageous and conveniently possible to use a servo-motor which follows a pilot valve, the pilot valve being manually set through a hand lever. This hand lever controls the brakes which lock the housing except in direct drive position.

The brakes are operated by fluid pressure and the hand lever merely shifts a brake valve as it moves into and out of direct drive position.

Thus a transmission that is always in perfect running balance is produced. In direct drive all parts turn over as a unit, so that mechanical losses are substantially eliminated.

By way of example a preferred embodiment of the invention will now be described by reference to the accompanying drawings, in which.

Figure 8:
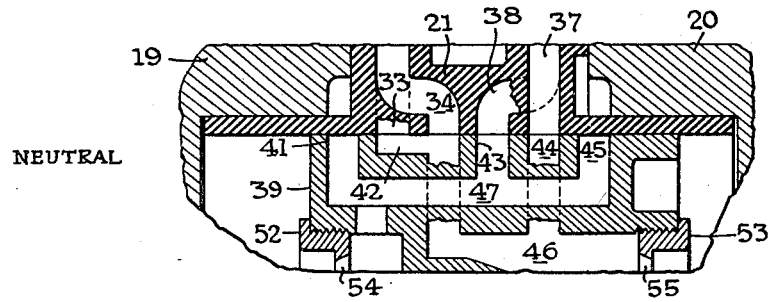

Figures 8, 9, 10 and 11 are fragmentary sectional diagrams of the control valve and its seat intended to indicate the relationship of the various ports. These views are not true sections but are diagrams to the extent that the inlet and discharge ports of the pump and the two ports of the motor which are interchanged for reversal purpose are drawn as if they lay in a common plane. This permits flows to be traced on a single view. Figure 8 shows neutral position, Figure 9 low speed ahead, Figure 10 direct drive ahead, and Figure 11 reverse.

Figure 1:
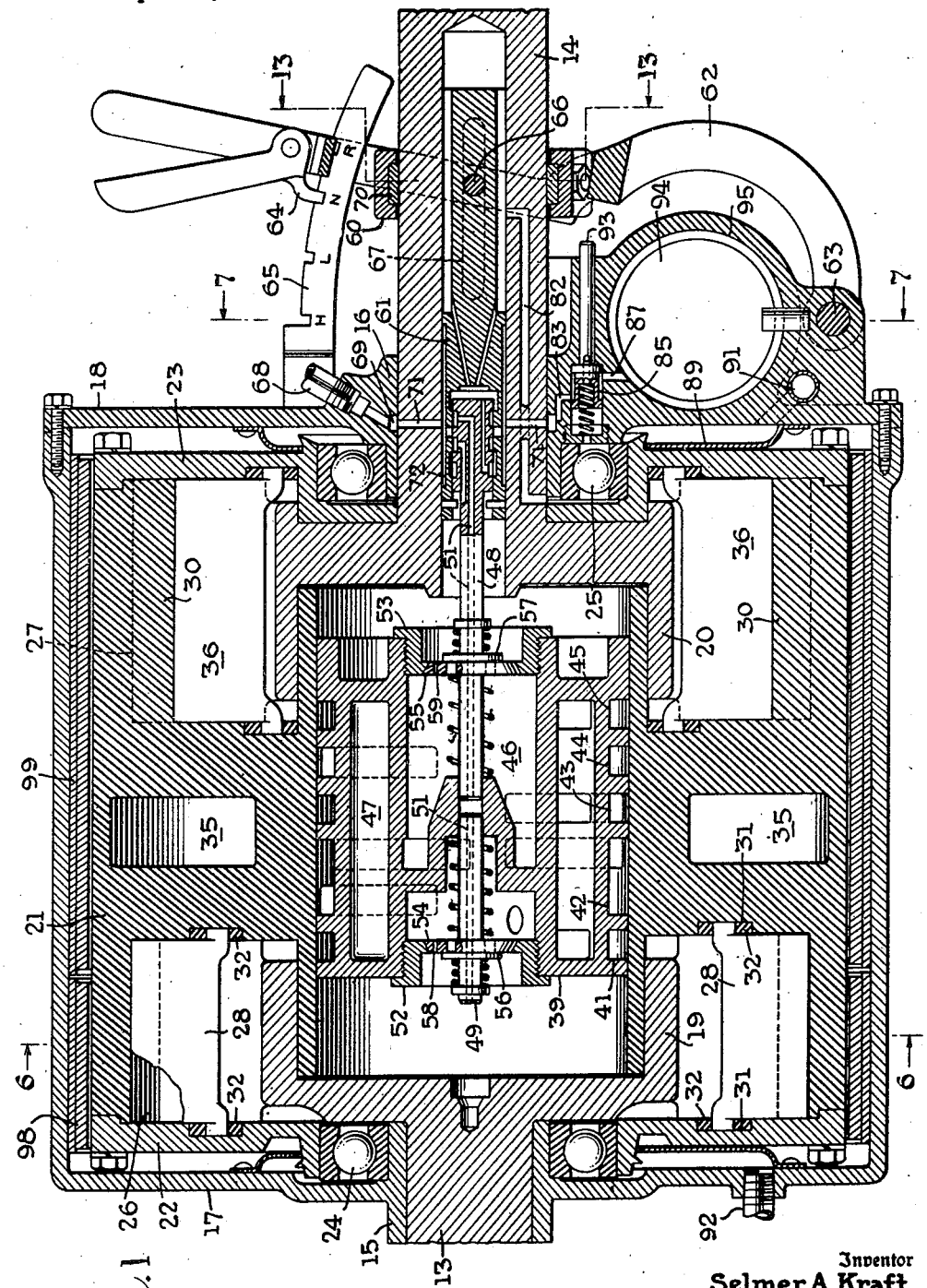
Figure 1 is a vertical axial section of the drive set in neutral position. The line of section is illustrated at 1—1 on Figure 6.

Figure 12 is an enlarged view of the servomotor and its pilot valve as shown in Figure 1 together with connections to the brake cylinder and the brake controlling valve.

Figure 13 is a section on the line 13—13 of Figure 1.

The drive shaft is indicated at 13 and the driven shaft at 14. The shaft 13 turns in a bearing 15 and the shaft 14 in a bearing 16 formed in the ends of an enclosing housing, comprising a shell 17 and a cover plate 18. The shaft 13 carries a cup-shaped rotor 19 and the shaft 14 carries a similar but slightly longer cup-shaped rotor 20. These shafts are coaxial and the cup-shaped rotors encircle oppositely extending cylindrical flanges formed in the main pump and motor housing 21. The housing 21 is cylindrical on its exterior so as to serve as a brake drum. The two ends of this housing are closed by cover plates 22 and 23 which are held in place by machine screws. The cover plate 22 turns on a ball bearing 24 whose inner race encircles the bearing 15. The cover plate 23 turns on a ball bearing 25 whose inner race encircles the bearing 16.

The housing 21 and the two cup-shaped rotors 19 and 20 form separate working spaces, namely a vane pump chamber 26 and a vane motor chamber 27. These are functionally similar, but the vane pump chamber 26 is shorter in an axial direction and less in radial dimension than is the vane motor chamber 27.

Figure 6:
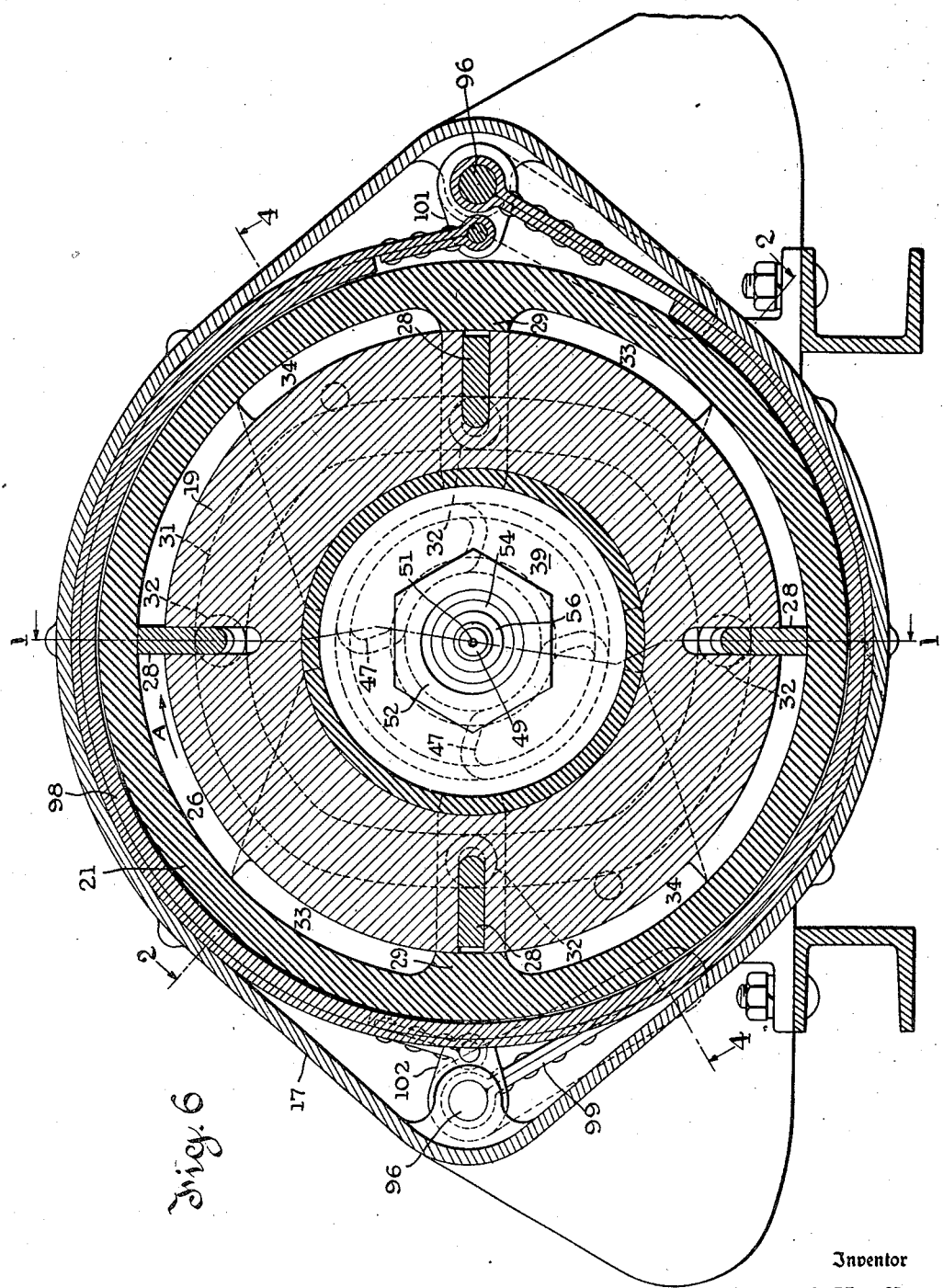
Figure 6 is a section on the line 6—6 of Figure 1.

Figure 6 shows the construction of the vane pump. The rotor 19 has four radial slots in which are mounted radially movable vanes 28. Formed on the wall of this chamber are inward extensions or abutments 29 which are diametrically opposed to each other and contact the periphery of the rotor 19. The vanes are guided by two cam tracks 31, one formed in the cover plate 22 and the other in an opposite portion of the housing 21. See Figures 1, 2, 4 and 6. The cam track is indicated in dotted lines at 31 in Figure 6 and in full lines in Figures 1, 2 and 4. The rollers 32 which follow the cam track are indicated in Figures 1 and 6.

This is a familiar type of vane pump, in which the cam track causes the vanes 28 to move clear of the abutments 29 but to contact the inner periphery of the housing 21 through substantial arcs between abutments 29.

The direction of rotation of shaft 13 is indicated by the arrow A on Figure 6. It turns clockwise when viewed from the driving end. Thus the ports 33 are inlet ports (see Fig. 2), and the ports 34 are discharge ports (see Fig. 4). Since the pump rotor turns in one direction only, the ports 34 are always discharge or high pressure ports, and the ports 33 are always low pressure or suction ports.

The ports 34 communicate with an annular chamber 35 formed in the housing 21. See Fig. 4. This chamber contains a body of trapped air which acts as a cushion against hydraulic shocks and as means for pressure equalization between the two discharge ports 34.

The motor unit is identical except that the vanes 36, and the chamber in which they work, are longer in an axial direction. Also the radial interval between the interior of housing 21 and the exterior of the rotor 20 is greater. The abutments 30 (see Fig. 1) which correspond to abutments 29 are displaced 90° from the abutments 29 of the pump unit, and the cam tracks are modified so as to carry the vanes clear of the abutments 30. These are simply details of design in a known vane type motor. The purpose of using different dimensions is to increase the area swept by the protruding vanes 36 as compared to the area swept by the vanes 28. The rotary speeds of the pump and motor in low forward, and in reverse setting are inversely proportional to the areas swept by the vanes.

Figure 4:
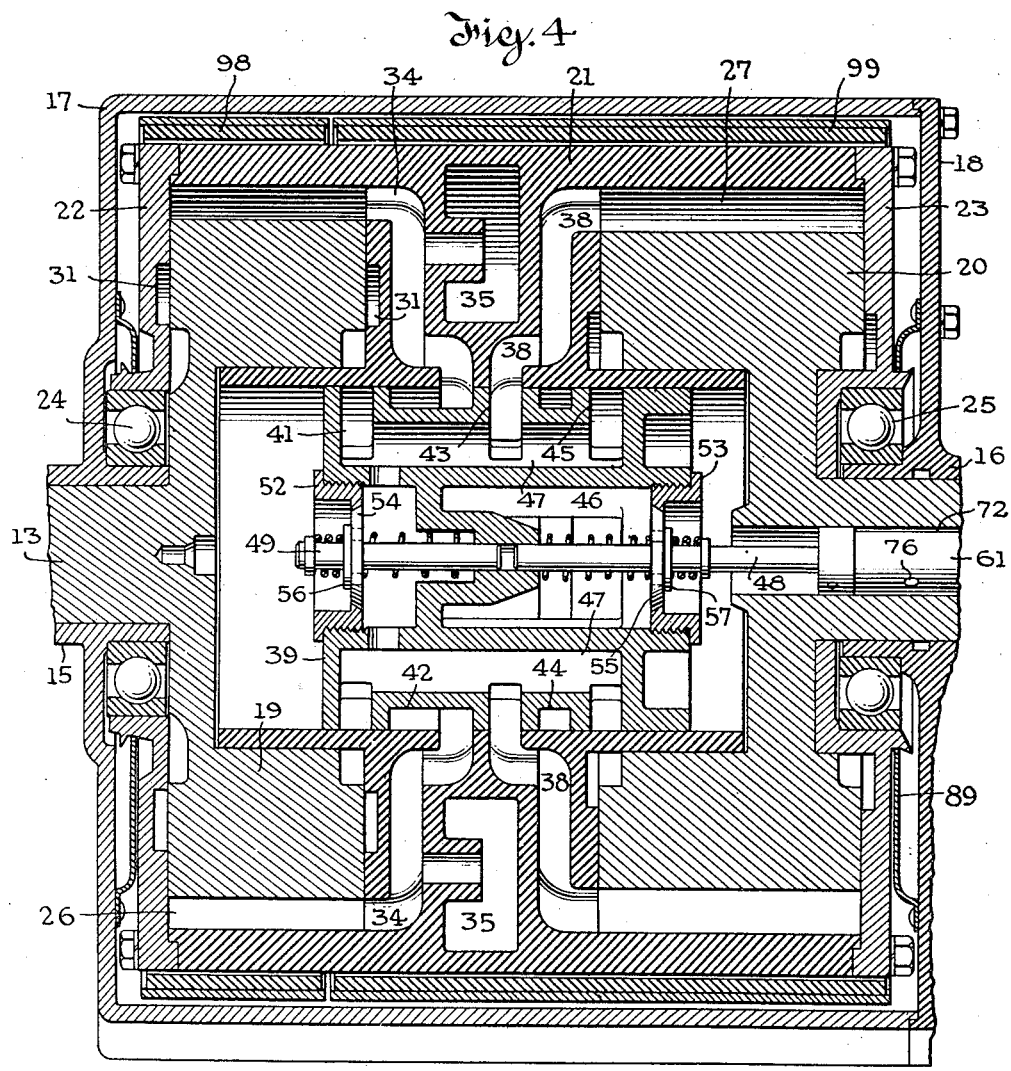
Figure 4 is a view similar to Figure 2, the plane of section being indicated by the line 4—4 on Figure 6.

The motor unit has two diametrically opposite ports 37 (see Fig. 2) and two diametrically opposite ports 38 (see Fig. 4). The ports 37 are the inlet ports for low speed forward and discharge ports for reverse. The ports 38 are inlet ports for reverse and discharge ports for low speed forward.

Figure 2:
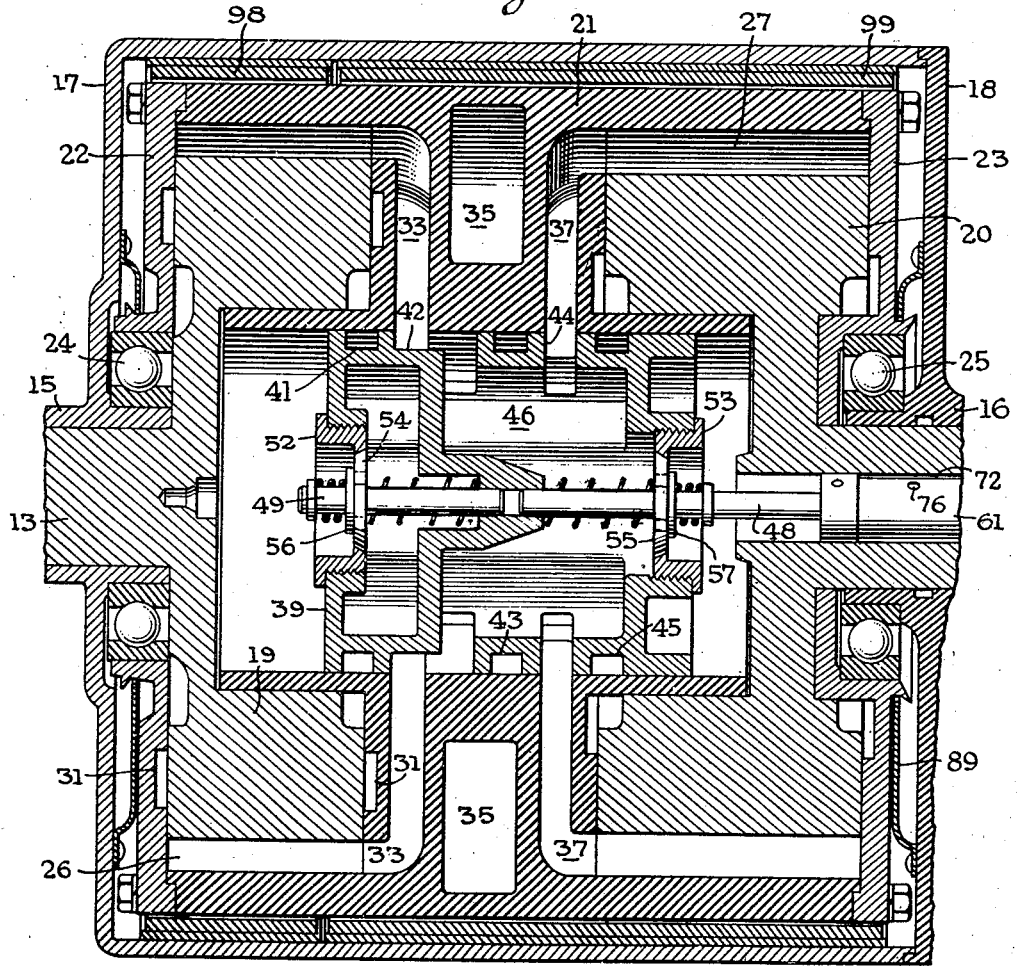
Figure 2 is a section on the plane 2—2 of Figure 6, the parts being shown in neutral position.

The rotors 19 and 20 were described as turning on sleeve-like extensions within the housing 21. The interior of these extensions and the partition which carries them form a cylindrical valve seat in which the control valve generally indicated by the numeral 39 works. The four ports 33, 34, 38 and 37 terminate in this valve seat in the order stated from left to right. The ports actually enter on different diametric planes as indicated in Figures 2 and 4, but in Figures 8 to 11 they are diagrammed as if they all were exposed in the plane of section.

Figure 3:
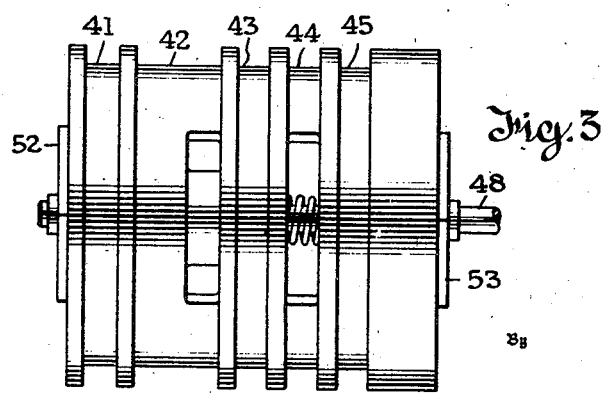
Figure 3 is an elevation of the control valve looking downward relatively to Figure 2.
Figure 5:
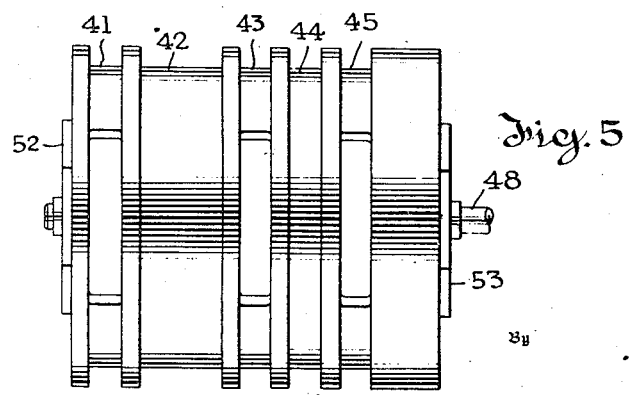
Figure 5 is an elevation of the control valve looking downward relatively to Figure 4.

The control valve 39 is formed with five circumferential grooves spaced apart by lands as clearly shown in Figures 3 and 5. The grooves 41, 43 and 45 communicate with each other by way of interconnected passages 47 which are cored within the control valve. Communications between the grooves 41, 43, 45 and these cored passages clearly appear in Figures 4 and 5. The grooves 42 and 44 communicate with each other through a chamber 46 within the valve 39, communications thereto being clearly shown in Figures 2 and 3.

Threaded into the ends of the valve 39 are opposed valve seats 52 and 53 with which coact respectively the inward opening poppet valves 54 and 55. The valve 54 is integral with a stem 49 guided in the hub of valve 39 and the valve is biased outward, that is toward its seat, by a rather long and light spring which does not load the valve heavily, it being desirable to have the valve open inward under a light pressure differential. Similarly the valve 55 is integral with a stem 48 also guided in the hub of valve 39 and biased toward its seat by a light coil compression spring so that it too will open inward under a light pressure differential. The stem 48 is extended outward beyond the valve 55 as shown and carries a pilot valve which will be described later.

Seated against the outer side of each of the valves 54 and 55 are respective relief poppet valves 56 and 57 which control ports formed through the valves 54 and 55. The valves 56 and 57 are biased in a closing direction by short heavy springs which react against collars fixed to the stems 49 and 48 respectively. An axial port 51 is formed in each of the stems 48 and 49 for a purpose which will be described later. It follows that the valve 54 will open readily to permit flow from the space to the left of the valve 39 toward the passage 47 in the valve, whereas the valve 56 will open to permit reverse flow but only under a very heavy pressure differential, for example, 500 lbs. per square inch. Similarly valve 55 opens readily to permit flow from the space to the right of the valve 39 to the space 46, whereas the valve 57 will open to permit reverse flow only under a heavy pressure differential, for example, 500 lbs. per square inch. Thus the valve 55 serves as means to admit oil to the pump circuit in either the neutral or low speed ahead position (see Figs. 8 and 9), whereas the valve 54 may open to admit oil from the space to the left of the valve 39 to the passage 47 in direct drive and reverse positions.

The function of the valve 56 is to relieve overloads in low speed position while the valve 57 functions to relieve overloads in direct drive position and in reverse position.

In order to provide for a limited but continuous oil circulation, by-passes 58 and 59 are provided. These are illustrated as holes drilled in the valves 54 and 55, but they can be variously located provided they establish the connections indicated in Figure 1.

The functions of the valve 39 will be obvious from Figures 8 to 11 and can be recapitulated as follows.

In neutral position, Figure 8, the discharge port 34 of the pump is connected to the suction port 33 of the pump by way of groove 42. Thus the pump is unloaded. Port 37 of the motor is connected to port 33 and 34, and port 38 is connected to chamber 47 which is blanked. Since the housing 21 is braked in this position (as will be described), the driven shaft is held against rotation, and oil idly circulates through the pump.

Figure 9:
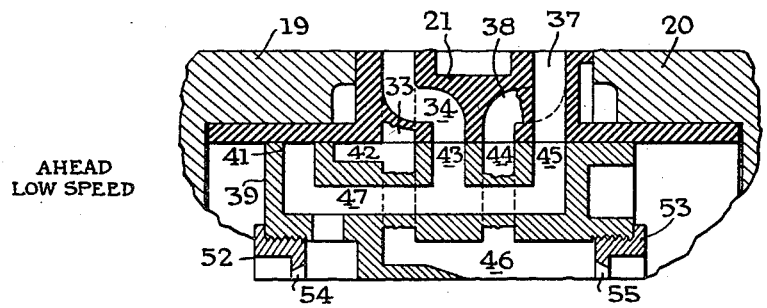
Figure 10:
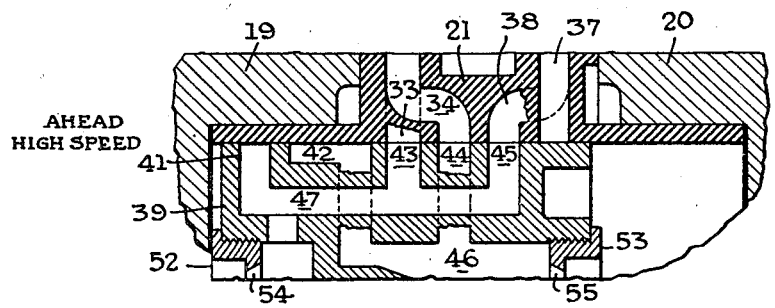
Figure 11:
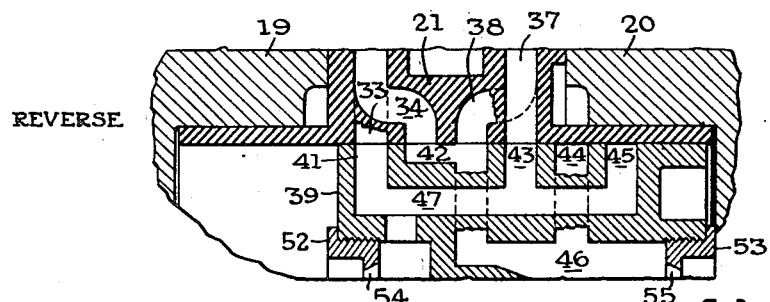

In low speed position, Figure 9, discharge port 34 is connected by passage 47 to the port 37 of the motor while port 38 from the motor is connected to suction port 33 by way of chamber 46. Here again the housing 21 is held against rotation. Consequently shaft 14 rotates in the same direction as shaft 13 but at reduced speed.

In the high speed position the housing 21 is free to rotate. Discharge port 34 is connected to passage 46 which is blanked. Hence the drive shaft and the housing must turn together. Port 37 is blanked. Hence the housing and the driven shaft must turn together. It follows that a direct drive is afforded.

In the reverse position (Fig. 11) the housing 21 is locked against rotation. Discharge port 34 is connected to port 38 by way of groove 42. The port 37 is connected to suction port 33 by way of passages 47. Consequently shaft 14 is driven at reduced speed and in the opposite direction from shaft 13.

It would be possible to move the valve 39 manually, but it is desirable to use a servomotor. This arrangement is illustrated in Figures 1 and 12. The driven shaft 14 is counterbored from its inner end and receives a shiftable valve seat 61. The position of the valve seat 61 determines the position which the valve 39 must assume. Therefore the seat 61 is arranged to be shifted by a lever 62 which is fulcrumed at 63 and has a latch 64 adapted to engage notches in a quadrant 65. These notches are designated R, N, L and H in Figure 1, the designations indicating reverse, neutral, low and high.

The lever 62 is connected by a pin and slot connection 50 to a collar 60 which is swivelled on a second collar 70. The collar 70 is slidable on the shaft and is connected to the seat 61 by a cross pin 66 which works in a slot 67 in the shaft, the length of the slot 67 being sufficient to permit the desired motion.

Oil under pressure is delivered from any suitable source through a connection 68 and flows to a groove 69 encircling shaft 14, thence through passages 71 in the shaft to groove 72 which is formed in the periphery of the seat 61. The seat 61 is counterbored from its inner end to receive an enlarged valve head formed on the end of valve stem 48. The axial bore 51 in this stem leads laterally to a ring port 73 which is thus in communication with the space to the left of valve 39. Another ring port 74 communicates by groove 75 with the space to the right of valve 39.

In the valve seat 61 there is a through port 76 which communicates with the space 72. There are also in this seat exhaust cavities 77 and 78 which drain by way of passages 79, 81, 82 to the ball bearing 25.

The follow up valve mechanism shown in Figure 12 is readily understood. If the seat 61 is moved to the left with reference to Figure 1 it supplies pressure fluid to the space to the right of valve 39 and exhausts the space to the left of 39. This action will occur until the valve 39 overtakes the seat 61, valve 39 serving as its own motor piston. A reverse action takes place if the seat 61 is moved to the right. The significant point is that seat 61 may be readily set in any chosen position and the valve 39 will then be power actuated to overtake it and stop. When the valve 39 stops, it is hydraulically locked.

A continuation 83 of passage 71 leads to a chamber 84 in which is mounted a hollow spool-shaped valve 85. The valve 85 is biased to the right by a coil compression spring 86. In its righthand position it connects a brake cylinder port 87 with the supply passages 71, 83. If the valve 85 is forced to the left compressing the spring, the port 83 is blanked and the port 87 is connected through the bore 88 of the valve 85 to the bearing 25.

Oil discharged through the bearing is collected by a guard 89 which delivers into a connection 91 (see Fig. 1). This and a companion connection 92 below bearing 24 return excess oil to a sump (not shown) from which it is drawn and again delivered under pressure to the connection 68. Any suitable pump (not shown in the drawings) may be used to develop the necessary pressure.

The valve 85 assumes the position shown in Figure 12 in reverse, neutral and low positions. In high or direct drive position it is forced to the left by a stem 93 (Fig. 1) which is in the path of lever 62.

Figure 7:
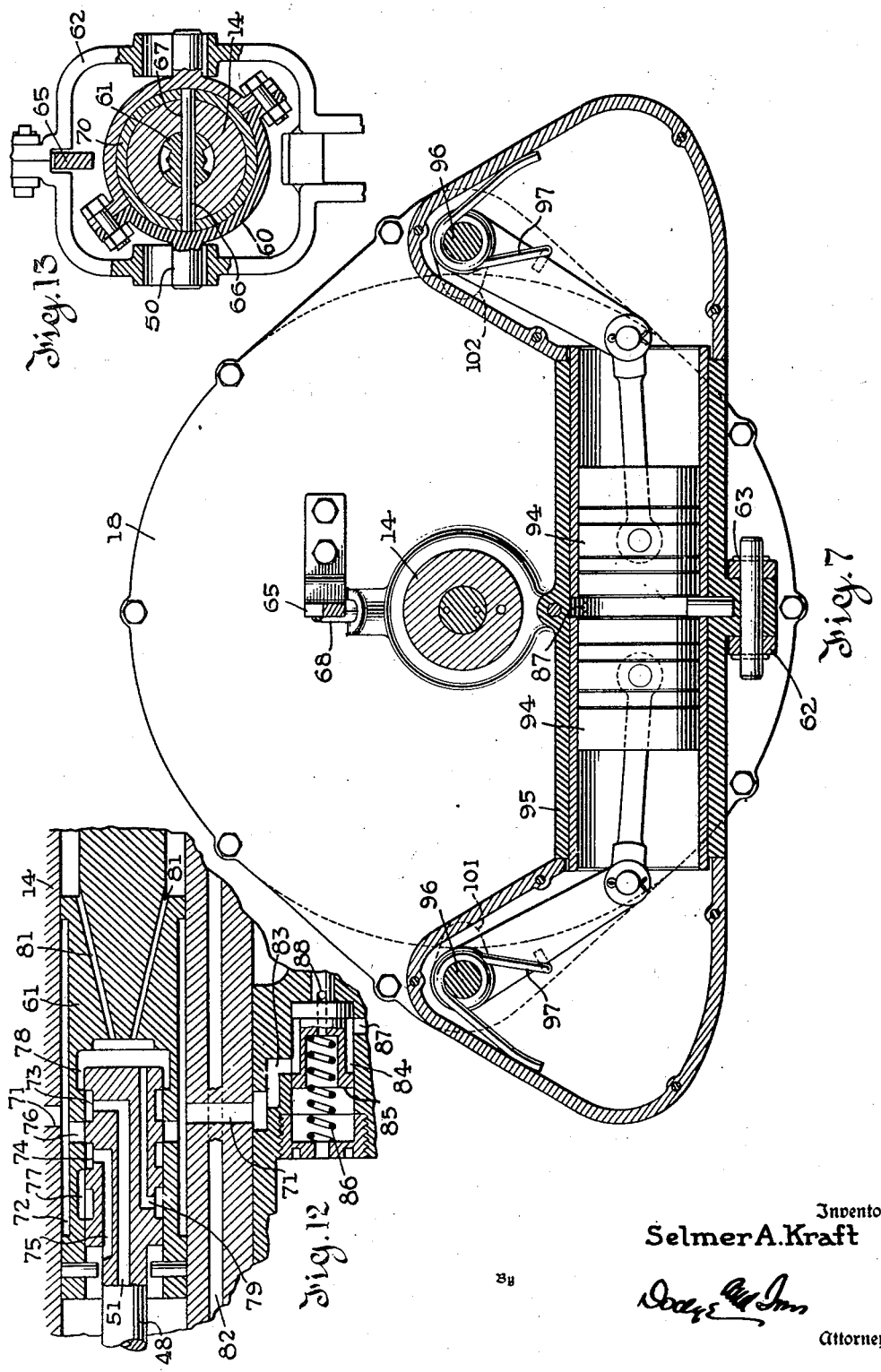
Figure 7 is a section on the line 7—7 of Figure 1.

The brake cylinder port 87 above mentioned leads to the space between two pistons 94, which are mounted in an open ended cylinder 95. (See Fig. 7.) Each piston is connected by a connecting rod and crank clearly shown in Figure 7 with the corresponding one of two rock shafts 96. Each shaft is biased in a brake releasing direction by a corresponding coil spring 97.

Encircling the housing 21 and arranged side by side are two brake bands 98 and 99. The band 98 is arranged to be contracted by an arm 101 on one of the two shafts 96. The band 99 is arranged to be contracted by an arm 102 on the other of the two shafts 96.

As is well known, band brakes have definite directional characteristics and the two brake bands are reversely arranged so that one is effective to resist rotation of the housing 21 in one direction and the other to resist rotation in the opposite direction.

The band 99 is wider than the band 98 because under reverse driving conditions the torque applied to housing 21 is greater than it is in the low speed forward setting. This arises from the fact that the torque reactions are cumulative in reverse whereas they partially neutralize each other in low speed forward.

*Operation*

The operation of the control valve and the follow up valve has already been explained, so that only a brief summary of operation is necessary.

Assume that the handle 62 is in neutral position as shown in Figure 1. This sets the valve seat 61 and establishes neutral position of the control valve 39. The brake valve 85 is held by the spring 86 in brake applying position. Consequently the housing 21 is held against rotation, the pump is unloaded, and the driven shaft is hydraulically locked.

If the lever 62 is shifted to reverse position, the housing remains locked and the pump and motor are interconnected (see Fig. 11) for driving at reduced speed in reverse direction.

In shifting between reverse and low, it is necessary to pass through the neutral position, which as explained, entails locking the driven shaft hydraulically, so that in a marine installation the propeller would be stopped.

Motion of the lever to low speed position leaves the brakes applied but establishes connections between the pump and motor which are the reverse of those just stated, causing the forward drive at reduced speed.

If the lever be now moved to high speed setting, the valve seat 61 and valve 39 move to extreme left position and the lever 62 will shift the valve 85 to brake releasing position.

The pump and the motor are each hydraulically locked so that the drive shaft housing 21 and the driven shaft turn together as a unit. The relief valves 56 and 57 will open to relieve overloads such as might occur if the propeller struck an obstruction. In the event of creep of any of the pump or motor parts when these are hydraulically locked, the valves 54 or 55 will open to admit oil to any working space subject to suction. This is an important detail because evacuation of working spaces in either the pump or the motor is likely to lead to shocks when the hydraulic lock is released.

The arrangement above described in detail has the advantage that all parts are in running balance and that in the high speed setting, which is the one used for the longest periods, there is a direct drive between the two connected shafts. The low ratio forward is necessarily the same as the reverse ratio but by properly proportioning the parts, the ratio can be made anything desired.

What is claimed is:

1. The combination of a rotary driving element including a vaned rotor; an axially alined driven element including a vaned rotor, said driving and driven elements being cup-shaped with their open ends presented toward each other; a housing mounted to rotate coaxially with said driving and driven elements and enclosing a displacement pump chamber within which the driving rotor operates and a displacement motor chamber in which the driven rotor operates and an axial cylindrical valve seat with inlet and discharge ports leading to and from the pump chamber and convertible inlet and discharge ports leading to the motor chamber, the portion of said housing enclosing said valve chamber having cylindrical ends on which the cup-shaped driving and driven elements are guided in relative rotary motion; a control valve shiftable in said seat and having four functional positions, namely a neutral position in which it connects the pump inlet and discharge ports, low speed forward and reverse positions in which respectively it connects the pump chamber in circuit with the motor chamber in relatively reverse senses, and a direct drive position in which it inhibits discharge from both the pump and motor chambers; braking means for holding said housing against rotation; and maneuvering means serving to shift said control valve between said functional positions and serving to apply the brake in positions other than direct drive and release the brake in direct drive position.

2. The combination of a rotary driving element including a vaned rotor; an axially alined driven element including a vaned rotor, said driving and driven elements being cup-shaped with their open ends presented toward each other; a housing mounted to rotate coaxially with said driving and driven elements and enclosing a displacement pump chamber within which the driving rotor operates and a displacement motor chamber in which the driven rotor operates and an axial cylindrical valve seat with inlet and discharge ports leading to and from the pump chamber and convertible inlet and discharge ports leading to the motor chamber, the portion of said housing enclosing said valve chamber having cylindrical ends on which the cup-shaped driving and driven elements are guided in relative rotary motion; a control valve shiftable in said seat and having four functional positions, namely a neutral position in which it connects the pump inlet and discharge ports, low speed forward and reverse positions in which respectively it connects the pump chamber in circuit with the motor chamber in relatively reverse senses, and a direct drive position in which it inhibits discharge from both the pump and motor chambers; means forming an annular gas filled cushioning space within said housing, coaxially encircling said valve chamber, and in communication with the pump discharge port; braking means for holding said housing against rotation; and maneuvering means serving to shift said control valve between said functional positions and serving to apply the brake in positions other than direct drive and release the brake in direct drive position.

3. The combination of a rotary driving element including a vaned rotor; an axially alined driven element including a vaned rotor, said driving and driven elements being cup-shaped with their open ends presented toward each other; a housing mounted to rotate coaxially with said driving and driven elements and enclosing a displacement pump chamber within which the driving rotor operates and a displacement motor chamber in which the driven rotor operates and an axial cylindrical valve seat with inlet and discharge ports leading to and from the pump chamber and convertible inlet and discharge ports leading to the motor chamber, the portion of said housing enclosing said valve chamber having cylindrical ends on which the cup-shaped driving and driven elements are guided in relative rotary motion; a control valve shiftable in said seat and having four functional positions, namely a neutral position in which it connects the pump inlet and discharge ports, low speed forward and reverse positions in which respectively it connects the pump chamber in circuit with the motor chamber in relatively reverse senses, and a direct drive position in which it inhibits discharge from both the pump and motor chambers; means forming an annular gas filled cushioning space within said housing, coaxially encircling said valve chamber, and in communication with the pump discharge port; relief valve means mounted at the axis of said control valve and adapted to relieve excessive hydraulic pressures; braking means for holding said housing against rotation; and maneuvering means serving to shift said control valve between said functional positions and serving to apply the brake in positions other than direct drive and release the brake in direct drive position.

4. The combination of a rotary driving element including a vaned rotor; an axially alined driven element including a vaned rotor; a housing mounted to rotate coaxially with said driving and driven elements and enclosing a displacement pump chamber within which the driving rotor operates and a displacement motor chamber in which the driven rotor operates and an axial valve seat with inlet and discharge ports leading to and from the pump chamber and convertible inlet and discharge ports leading to the motor chamber; a control valve shiftable in said seat and having four functional positions, namely a neutral position in which it connects the pump inlet and discharge ports, low speed forward and reverse positions in which respectively it connects the pump chamber in circuit with the motor chamber in relatively reverse senses, and a direct drive position in which it inhibits discharge from both the pump and motor chambers; braking means for holding said housing against rotation; fluid pressure actuated means for operating said braking means; servomotor means for shifting said control valve; and manually operable means including a follow up valve for said servomotor, a brake valve controlling the braking means and an actuator common to said valves, and so arranged that the brake is released when the actuator is in direct drive position and applied when it is in other positions.

5. The combination defined in claim 4 in which the control valve is of the piston type and itself serves as the piston element of the servomotor.

6. The combination of a rotary driving element including a vaned rotor; an axially alined driven element including a vaned rotor; a housing mounted to rotate coaxially with said driving and driven elements and enclosing a displacement pump chamber within which the driving rotor operates and a displacement motor chamber in which the driven rotor operates and an axial valve seat with inlet and discharge ports leading to and from the pump chamber and convertible inlet and discharge ports leading to the motor chamber; a control valve shiftable in said seat and having four functional positions, namely a neutral position in which it connects the pump inlet and discharge ports, low speed forward and reverse positions in which respectively it connects the pump chamber in circuit with the motor chamber in relatively reverse senses, and a direct drive position in which it inhibits discharge from both the pump and motor chambers; braking means for holding said housing against rotation; fluid pressure actuated means for operating said braking means; servomotor means for shifting said control valve; a follow up valve controlling the servo-motor means and shiftable to set the control valve; a brake valve connected to control said brake operating means; and a maneuvering member connected to said follow up valve and having a lost motion connection with said brake valve, so arranged that the brake valve releases the brake in direct drive position of the maneuvering member and releases it in other positions thereof.

SELMER A. KRAFT.

REFERENCES CITED

The following references are of record in the file of this patent:

UNITED STATES PATENTS

| Number | Name | Date |
|---|---|---|
| 872,203 | Shank | Nov. 26, 1907 |
| 1,080,282 | Kellogg | Dec. 2, 1913 |
| 1,243,640 | Story | Oct. 16, 1917 |
| 1,354,592 | Bair | Oct. 5, 1920 |
| 1,411,348 | Haeberlein | Apr. 4, 1922 |
| 1,885,265 | Jackson | Nov. 1, 1932 |
| 2,211,402 | Benedek | Aug. 13, 1940 |
| 2,333,620 | Tripp et al. | Nov. 2, 1943 |
| 2,337,499 | Roth | Dec. 21, 1943 |

FOREIGN PATENTS

| Number | Country | Date |
|---|---|---|
| 345,523 | Germany | Dec. 12, 1921 |